United States Patent
Lembree

[11] Patent Number: 5,560,139
[45] Date of Patent: Oct. 1, 1996

[54] FISHING ROD WITH SWIVELING LINE GUIDES

[76] Inventor: Gregory P. Lembree, 100 Boatswains Way #102, Chelsea, Mass. 02150

[21] Appl. No.: 375,845

[22] Filed: Jan. 20, 1995

[51] Int. Cl.$^6$ .................................................. A01K 87/04
[52] U.S. Cl. .................................................................. 43/24
[58] Field of Search ......................................................... 43/24

[56] References Cited

U.S. PATENT DOCUMENTS

| | | | |
|---|---|---|---|
| 2,324,353 | 7/1943 | Berry | 43/24 |
| 3,581,427 | 6/1971 | Reinertson | 43/24 |
| 3,641,696 | 2/1972 | Fleischer | 43/24 |
| 3,702,514 | 11/1972 | Donato | 43/24 |
| 4,070,785 | 1/1978 | Hawk | 43/24 |
| 4,445,293 | 5/1984 | Ohmura | 43/24 |
| 5,361,529 | 11/1994 | Lindler | 43/24 |

FOREIGN PATENT DOCUMENTS

| 1377264 | 9/1964 | France | 43/24 |
|---|---|---|---|

*Primary Examiner*—J. Elpel
*Attorney, Agent, or Firm*—Bookstein & Kudirka, P.C.

[57] ABSTRACT

A fishing rod has line guides which pivot relative to the rod as tension from the line puts lateral forces on the line guides. The pivoting action of the line guides reduces the necessity to rotate the rod such as to angle the line guides in the general direction of a hooked fish. Each line guide consists of a housing which is secured to the rod and an eyelet which is rotatably connected to the housing. The line guides may use conventional line guides having feet which, instead of mounting to the rod, are each affixed to a rotatable member which rotates within one of the housings. The housings may also be provided with mounting legs like the feet of conventional line guides, thus allowing the housings to be attached to the rod with the same equipment as used with conventional line guides. The eyelet may be supported by one or by two housings. The pivotable connection may be spring-loaded to bias the eyelets toward a particular angular position. The eyelets may also be secured to the rod by feet which reside in slots in the rod which allow the rotation of the line guides relative to the rod as the feet move within the slots.

24 Claims, 7 Drawing Sheets

FISHING ROD WITH SWIVELING LINE GUIDES

BACKGROUND OF THE INVENTION

1. Field of the Invention

This invention is related to the field of fishing and, more particularly, to fishing with a rod and reel.

2. Description of the Related Art

In both sport and commercial fishing, use of a rod and reel is quite often the method of choice. The conventional fishing rod has a mounting for a reel at a proximal end and a series of line guides affixed to the rod along a straight line from the proximal to the distal end. The line guides are rigidly fixed to the shaft of the rod, and provide eyelets through which fishing line passes to provide an angler using the rod with leverage in controlling the point at which the line departs from the rod. In addition, the rod is typically flexible, allowing tension in the line to be absorbed by the bending of the rod to decrease the potential for the line to snap upon a quick pull on the line by a hooked fish.

To help ensure smooth control of the line within the line guides, most rods are designed to flex toward the direction in which the line guides project from the shaft of the rod. Thus, as the rod bends under line tension, the line approximates an arc which is defined by the points of contact between the line and the line guides. The force between the line and the rod is therefore distributed between the line guides.

In practice, maintaining the appropriate distribution of force between the line guides requires that the angler rotate the rod such that the line guides approximately face the location of the fish which is pulling on the line. If the rod is not rotated to face the fish, the force on the rod is not in the direction faced by the line guides, and the rod is forced to bend away from its designed direction of flexibility. As such, the distribution of force on the line guides is uneven, and a localized region of the force between the line and the rod develops which could result in breakage of the line. Furthermore, the uneven distribution makes it more difficult for the angler to control the rod, and therefore to control the landing of the fish.

While the ability of the angler to rotate the rod reduces the occurrence of forces on the rod away from its intended direction of flexibility, the necessity of the angler to control the reel, which is rigidly affixed to the rod, limits the amount of rotation which is available before adequate control of the reel is lost. In addition, it is often the case that the angler is provided with a limited range of space within which to move his body and the angle of the rod. This creates a situation in which compensating rotation of the rod may be difficult or impossible. It is therefore an object of this invention to provide a fishing rod which is less dependent on the orientation of the rod to provide appropriate distribution of force between the rod and the line.

SUMMARY OF THE INVENTION

In accordance with the present invention, a fishing rod is provided having line guides with eyelets that are movable in an angular direction about an axis parallel to the axis of the rod. In the preferred embodiment, the eyelets have a freedom of angular movement of approximately 180°. Each line guide includes a housing to which an-eyelet is attached by a pivotable connection. The pivotable connection has an axis of rotation parallel to a longitudinal axis of the rod. When a fishing line is threaded through the eyelets, changes in the lateral forces on the rod, caused by a fish pulling on the line, cause the eyelets to pivot.

In the preferred embodiment, the eyelet is mounted to a rotatable member which resides in the housing. The rotatable member has an outer surface, the shape of which matches an inner surface of the housing. The connection between the rotatable member and the housing allows relative rotation between the housing and the rotatable member, but restricts lateral movement therebetween. Preferably, the outer surface of the rotatable member has a relatively low coefficient of friction, as does the inner surface of the housing. These contact surfaces are also preferably of a material which is resistive to wear.

In the preferred embodiment, a lip of the housing which has an inner diameter that is smaller than an outer diameter of the rotatable member and thereby prevents the withdrawal of the rotatable member from the housing. The rotatable member is also preferably constructed with an inner slot which receives the foot of a conventional line guide. Thus, part of the eyelet may be a conventional line guide which is attached to the rotatable member. As such, the production of the line guide is simplified through the use of existing commercial components.

In one alternative embodiment, a biasing spring is connected between each eyelet and its housing to bias the eyelet of the line guide to a predetermined angular position. Preferably, under the bias of the spring, the eyelet tends to reside in a "home" position in which a radial line from the rod which passes through the rotating connection between the eyelet and the housing substantially bisects the eyelet, This "home" position is roughly the same as the position of an eyelet in a conventional fishing rod. The bias of the spring is low enough to be overcome by a force on the eyelet by the line in an angular direction about the rotational axis of the rotating connection between the eyelet and the housing. However, the eyelets return to the home position in the absence of such forces from the line.

In the preferred embodiment, two housings are used for each eyelet, each eyelet having two rotatable members, one residing in each housing. The insertion direction of each rotatable member into its respective housing opposes that of the other, and the proximity of the two housings prevents both eyelets from separating from their respective housings. The two rotational connections formed by the housings and their corresponding rotatable members are coaxial along an axis parallel to the longitudinal axis of the rod. Relative to the housings, the eyelet has a longitudinal position between the longitudinal positions of the housings. Thus, the eyelet is supported from two points along the rotational axis of the rotating connection.

Each line guide housing is rigidly connected to a "leg" which is shaped like the "foot" of a conventional line guide. The "leg" of the housing preferably has a surface which conforms to the surface of the rod to allow it to be connected to the rod in a manner identical to that of conventional line guides. Typically, the connection method uses a winding of thread or string around the leg and the rod, so as to lash the line guide to the rod. This allows the use of conventional fishing rods with the present invention. It also permits the use of conventional winding machines for attaching the housing to the rod.

Figure 1:
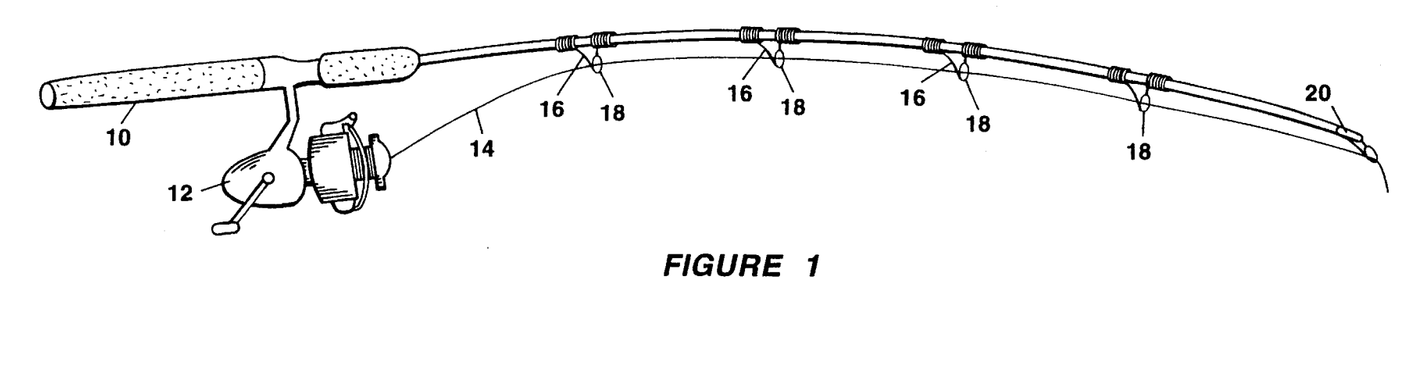
FIG. 1 is a side view of a fishing rod using line guides according to the present invention.
Figure 2:
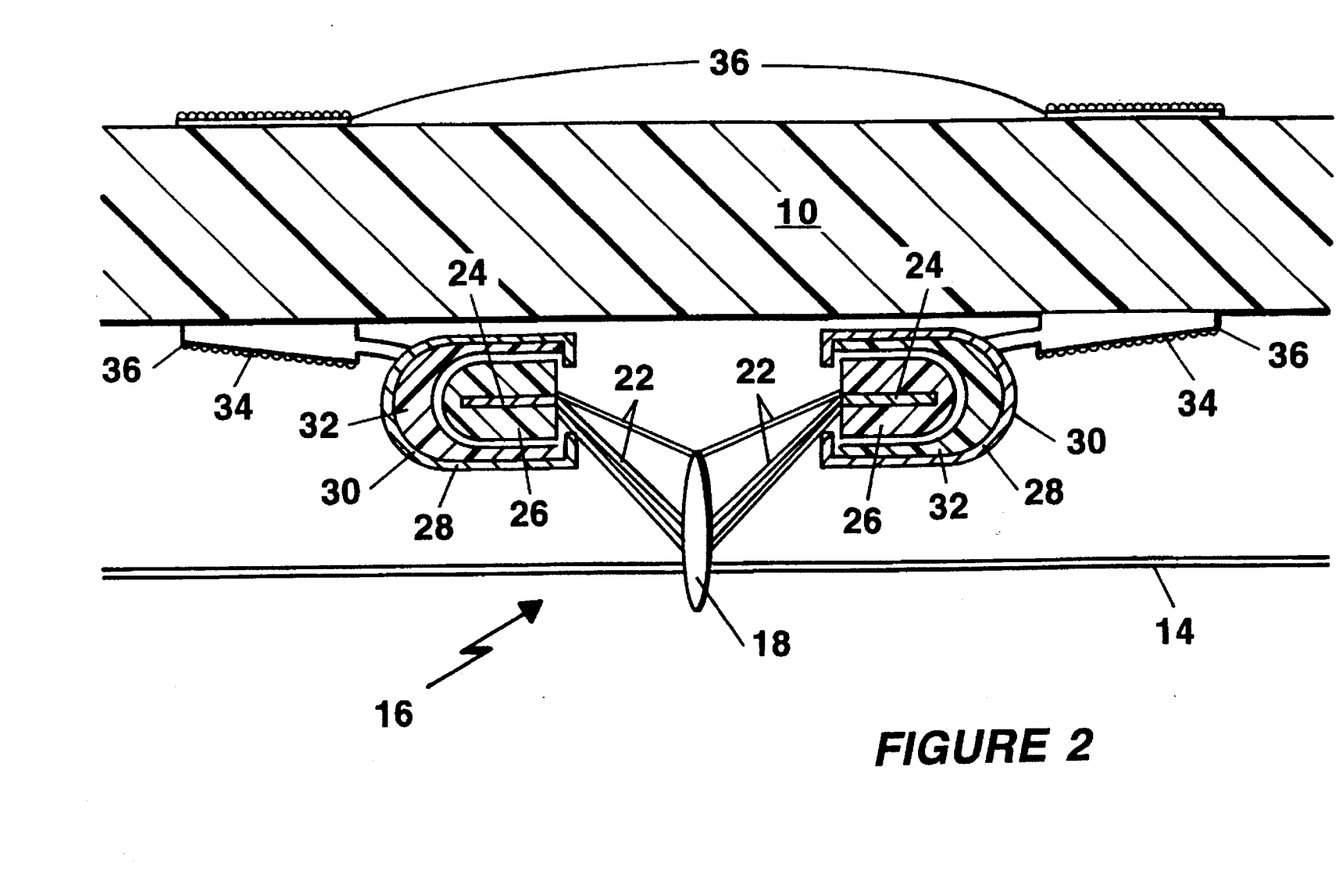
FIG. 2 is a cross sectional side view of a line guide according to the present invention.
Figure 3A:
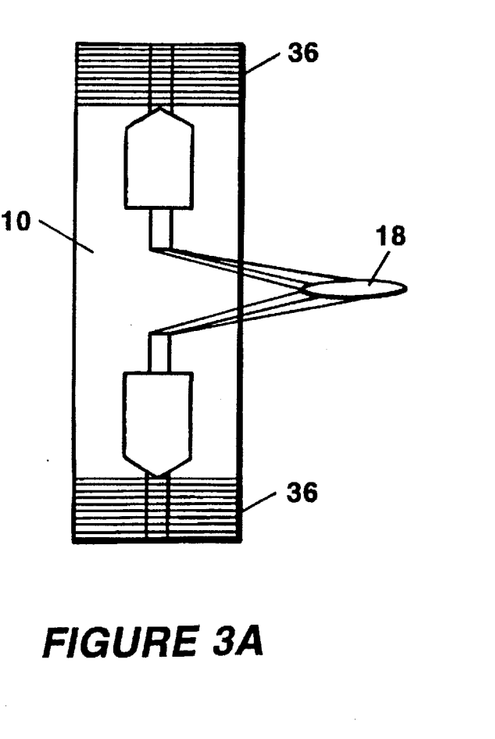
FIGS. 3A, 3B and 3C are three different front views showing, respectively, three different angular orientations of a line guide according to the present invention.
Figure 3B:
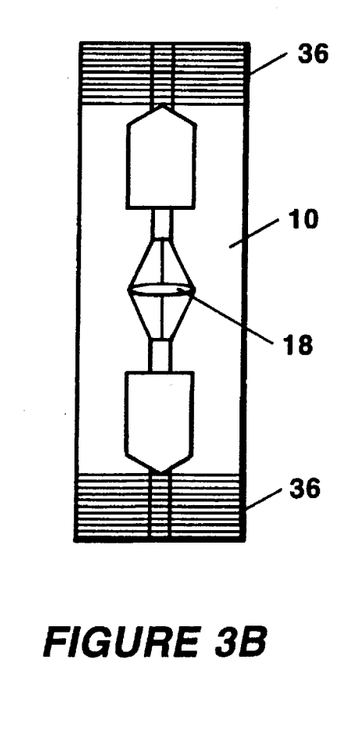
Figure 3C:
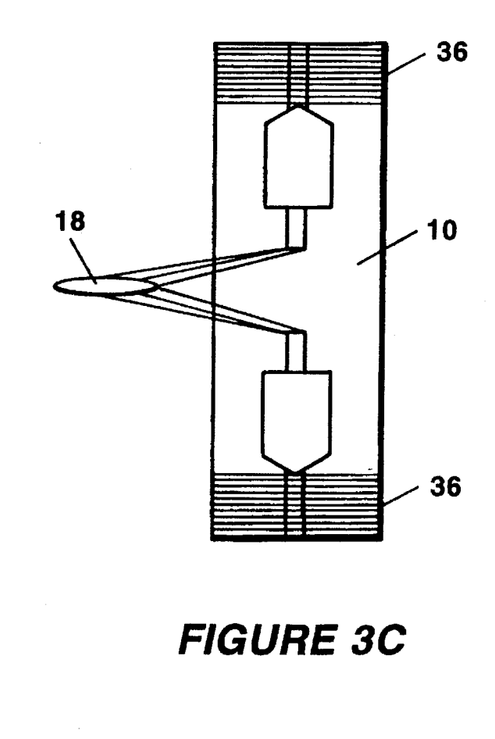

In an alternative embodiment, the eyelet has a pin, rather than the wider rotatable member of the embodiment of FIGS. 1–3. The pin mounts in a housing, which is rigidly connected to the rod. The housing receives the pin, and allows rotation of the pin within the housing, while preventing lateral movement of the pin. Preferably, each eyelet has two pins aligned along a common axis, each of which resides in a different housing The pins have a common axis of rotation and secure the eyelet at two different places along the rotational axis. The insertion direction of each pin into its respective housing opposes that of the other, and the proximity of the two housings prevents both eyelets from separating from their respective housing.

In another alternative embodiment, the rod has semi-circular slots within each of which one of two legs of a line guide resides. The stiffness of the legs and support arms which connect the feet to the eyelet of the line guide create a fixed distance between the two legs. Because of a lip on each slot, the legs are restricted to their respective slot and move together rotationally around the rod. In this embodiment, no conventional components are used in the construction of the fishing rod, but the translation of force from the eyelet to the rod is direct, such that the force on the eyelet is colinear with the force on the rod.

DETAILED DESCRIPTION OF THE PREFERRED EMBODIMENTS

Shown in FIG. 1 is a fishing rod 10 having a reel 12 upon which a quantity of fishing line 14 is wound. The line 14 exits the reel 12, residing adjacent to the rod 10 from a proximal end of the rod to a distal end. The line 14 is restricted to a position adjacent to the rod 10 by a plurality of line guides 16 which are interspersed along the length of the rod 10. In addition to the line guides 16, there is a distal line guide 20 positioned at the distal end of the rod 10. Each of the line guides 16, 20 includes an eyelet 18 through which the line passes, the eyelets 18 being arranged such that, when the rod is in an unbended state, the eyelets are approximately parallel with one another. Thus, the line 14 follows a roughly straight line from the reel to the point at which it exits the distal line guide 20.

As described below, the line guides 16 provide a pivoting connection by which the eyelets may pivot about an axis parallel to a longitudinal axis of the rod 10. In the preferred embodiment, the distal line guide 20 is fixed relative to the rod 10, and therefore does not pivot with the other line guides 20. However, as is discussed in conjunction with FIG. 6, the distal line guide 20 may also be pivotable, like the line guides 16, such that all of the line guides 16, 20 pivot together in unison.

Depicted in FIG. 2 is a cross sectional side view of one of line guides 16 attached to rod 10. Line 14 passes through eyelet 18, and is free to move in a longitudinal direction relative thereto (subject to being constrained by reel 12). The eyelet 18 is supported by support arms 22 of which, in the present embodiment, there are two to each side of the eyelet 18. Each pair of support arms 22 terminates in a single foot 24, which is integral with the material of its respective support arms 22. The two feet 24 face opposite directions, but have longitudinal axes which are colinear. As such, the two feet provide a base from which the eyelet 18 is supported.

Each of the feet 24 is embedded in a rotatable member 26 which resides in a housing 28. Each of the feet 24 has a somewhat flat profile in one dimension so that its connection to its respective rotatable member 26 resists any angular movement between the two. Each rotatable member 26 is of a material which preferable has a low coefficient of friction, but which is resistive to wear. Each rotatable member 26 is partially cylindrical in shape so that it is free to rotate within the housing 28 within which it is mounted, subject to friction between the outer surface of the rotatable member and the inner surface of the housing 28. While, in the preferred embodiment, each rotatable member 26 is rounded on the side of the rotatable member 26 away from the point of contact with the eyelet supports 22, it will be understood by those skilled in the art that that surface can, alternatively, be shaped differently, provided there is no prevention of rotational movement between the rotatable member 26 and its respective housing 28.

The housings 28 of the present invention are disposed with an open side of each facing the open side of the other. In fact, the housings are identical in structure and are symmetrical with each other about a plane which is perpendicular to a rotational axis of the rotatable members 26 and which passes through the eyelet 18. Each housing consists of a durable outer shell 30, preferably a hard metal, which is lined with an inner surface material 32 that has a low coefficient of friction and which is resistive to wear. The inner surface 32 has a contour which matches that of the outer surface of the rotatable member 26 with which it makes contact. Thus, each rotatable member 26 is free to rotate within its respective housing, the outer surface of the rotatable member and the inner surface 32 of the housing providing a good, low friction rotational connection.

Integral with the outer shell 30 of each housing is a mounting leg 34, by which the housing is connected to the rod 10. In the preferred embodiment, each mounting leg is attached to the rod by a winding of thread 36. As in conventional fishing rods, a winding machine may be used which wraps numerous turns of the thread 36 around both the rod and the leg 34 of a housing, while the leg 34 is located adjacent to the rod 10, thus lashing it to the rod. With each leg 34 bound to the rod 10 in this manner, both housings 28 (and therefore the eyelet 18) are secured to the rod. Wire can be used as an alternative to thread and, in fact, other methods of securing the housings to the rod 10 can be used without exceeding the scope of the invention.

Referring to FIGS. 3A, 3B and 3C, three different angular orientations of a line guide 16 according to the present invention are shown. Because of the rotational connection between the rotatable member 26 and housing 28 of the line guide 16 (FIG. 2), the eyelets 18 of the line guide 16 are free to move between a continuous range of angular positions. This range of positions is limited by the rod itself, which prevents angular movement of the eyelets 18 past a certain points at which the eyelets contact the rod 10. Because of the shape and size of the eyelets, a range of motion of approximately 180° is defined. FIGS. 3A, 3B and 3C show the three of the positions in this range.

In FIG. 3A, a first extreme position is shown in which the eyelet 18 is prevented from rotating any further in a first direction. In FIG. 3B, a centered position is shown, in which the eyelet 18 projects straight out from the rod such that a radial line from the rod 10 which passes through the axis of rotation of the line guide 16 bisects the eyelet 18. This position is essentially the same as that of conventional, non-rotating line guides. In FIG. 3C, the eyelet 18 is shown at an extreme opposite to that of FIG. 3A. Thus, motion of the eyelet 18 between the position shown in FIG. 3A and that of FIG. 3C covers the full range of motion of the eyelet 18.

A primary advantage of providing the line guides 16 of the rod 10 with the freedom of motion shown in FIGS. 3A-3C is understood when considering the forces developed between the line 14 and the rod 10 after a fish is hooked. While there is a tensile force on the line from the pull of the fish, there are also lateral forces on the line guides which typically develop. Assuming the distal end of the rod is pointing away from the fish (as is generally considered proper fishing technique), such forces occur as the rod 10 bends. Conventional rods are built to be most flexible toward the radial direction in which the line guides project from the rod. The best control of a conventional rod is therefore achieved by positioning the rod such that the line guides project from the rod in the general direction of a hooked fish (i.e. so that the line is positioned in each line guide eyelet at the furthest position from the shaft of the rod). By doing so, pulling on the line by the fish results in the rod bending in the direction of greatest flexibility.

In the preferred embodiment of the present invention, the rod 10 is provided with an equal degree of flexibility in all of the directions which the eyelets 18 of the line guides 16 may face. That is, all radial directions from the rod which are parallel to one of the radial directions from the axis of rotation which bisects the eyelet, in any of the eyelet positions throughout the rotational range of the line guides, have an equal degree of flexibility. Thus, as the movement of the fish moves the line 14 in the eyelets 18, and the eyelets correspondingly pivot toward the new direction, the rod 10 will bend with equal ease in a direction parallel to the new direction faced by the eyelets, for all angular directions in the eyelets range of rotation. As the fish moves, it is therefore unnecessary to pivot the rod 10 to change the direction faced by the eyelets.

Figure 4:
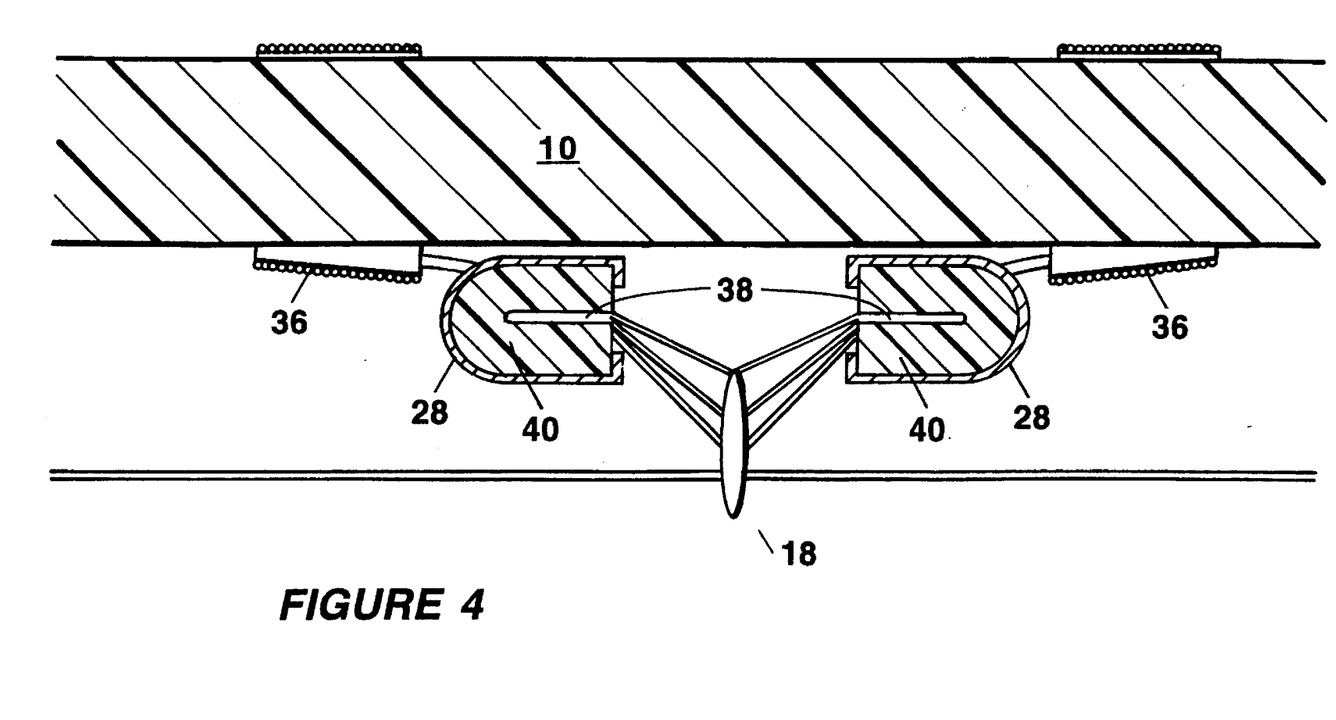
FIG. 4 is a cross sectional side view of an alternative embodiment of the invention in which a line guide is supported from only one side.

Depicted in FIG. 4 is an alternative embodiment of the invention in which the rotational connection between eyelet 18 and each housing 28 is formed by one of pins 38, each of which mounts in material 40 of its respective housing. The housing material 40 is preferably a material with a low coefficient of friction that is resistive to wear. The two pins are each cylindrical and are positioned coaxially with each other along an axis which is parallel with a longitudinal axis of the rod 10. As in the embodiment of FIG. 2, the two housings are bound to the rod by thread 36, and are positioned far enough from each other to not interfere with the rotation of the eyelet 18, but close enough that the eyelet 18 is trapped between them. This embodiment reduces the number of parts necessary for the invention.

Figure 5:
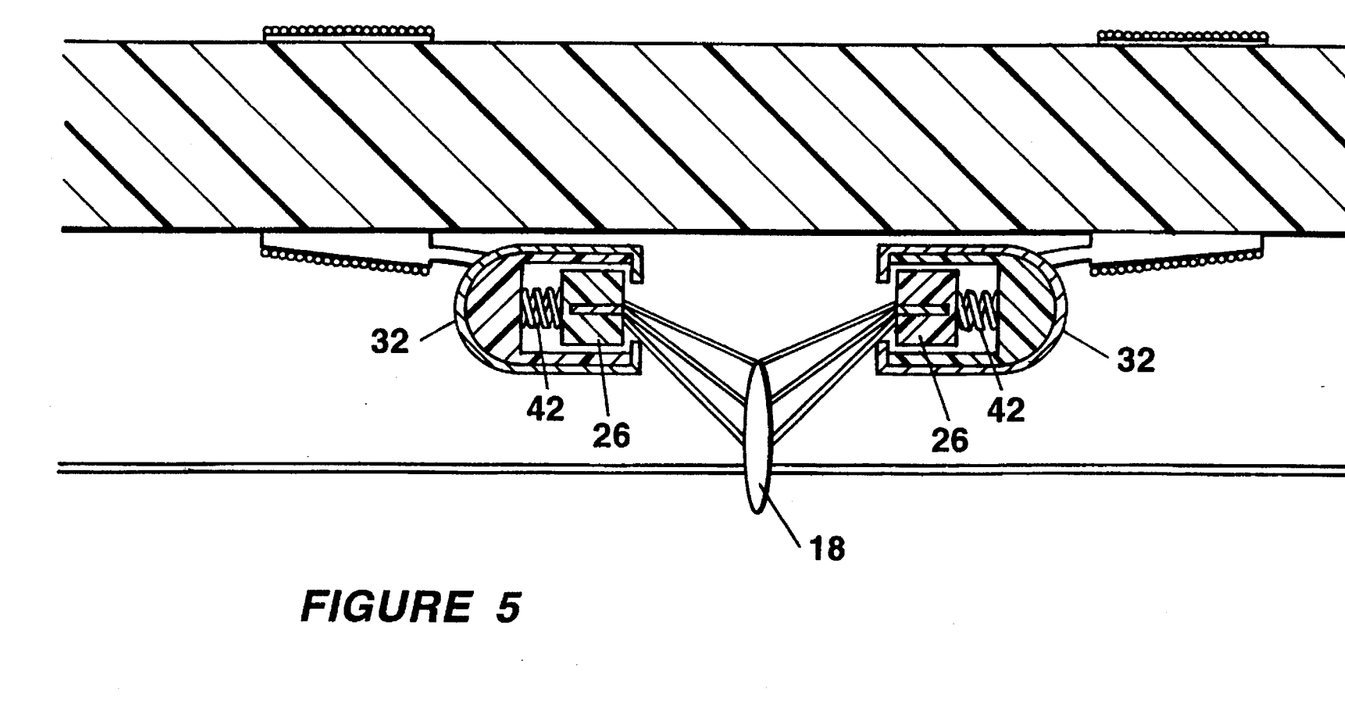
FIG. 5 is a cross sectional side view of another alternative embodiment of the invention in which a line guide has an integral rotational connection in the shape of a pin-shaped support.

FIG. 5 shows another alternative embodiment of the invention. The rotational connection between the eyelet 18 and each housing 28 is similar to that of the FIG. 2 embodiment, but includes a coil spring 42. Each coil spring is rigidly connected to the inner surface material 32 of its respective housing and to its respective rotatable member 26., and biases the eyelet toward the rotational position shown in FIG. 3B. The connection is such that rotation of the eyelet relative to the housing (in either angular direction away from the position of FIG. 3B) is against the force of the springs 42. When a force which rotates the eyelet is removed, the spring bias causes the eyelet 18 to return to the position shown in FIG. 3B. In this embodiment, the force of the spring is such that an expected force on line 14 caused by the pull of a fish is sufficient to rotationally displace the eyelets against the force of their respective springs 42. When the force is removed (e.g. when the fish is landed), the eyelets 18 return to the position shown in FIG. 3B.

Figure 6:
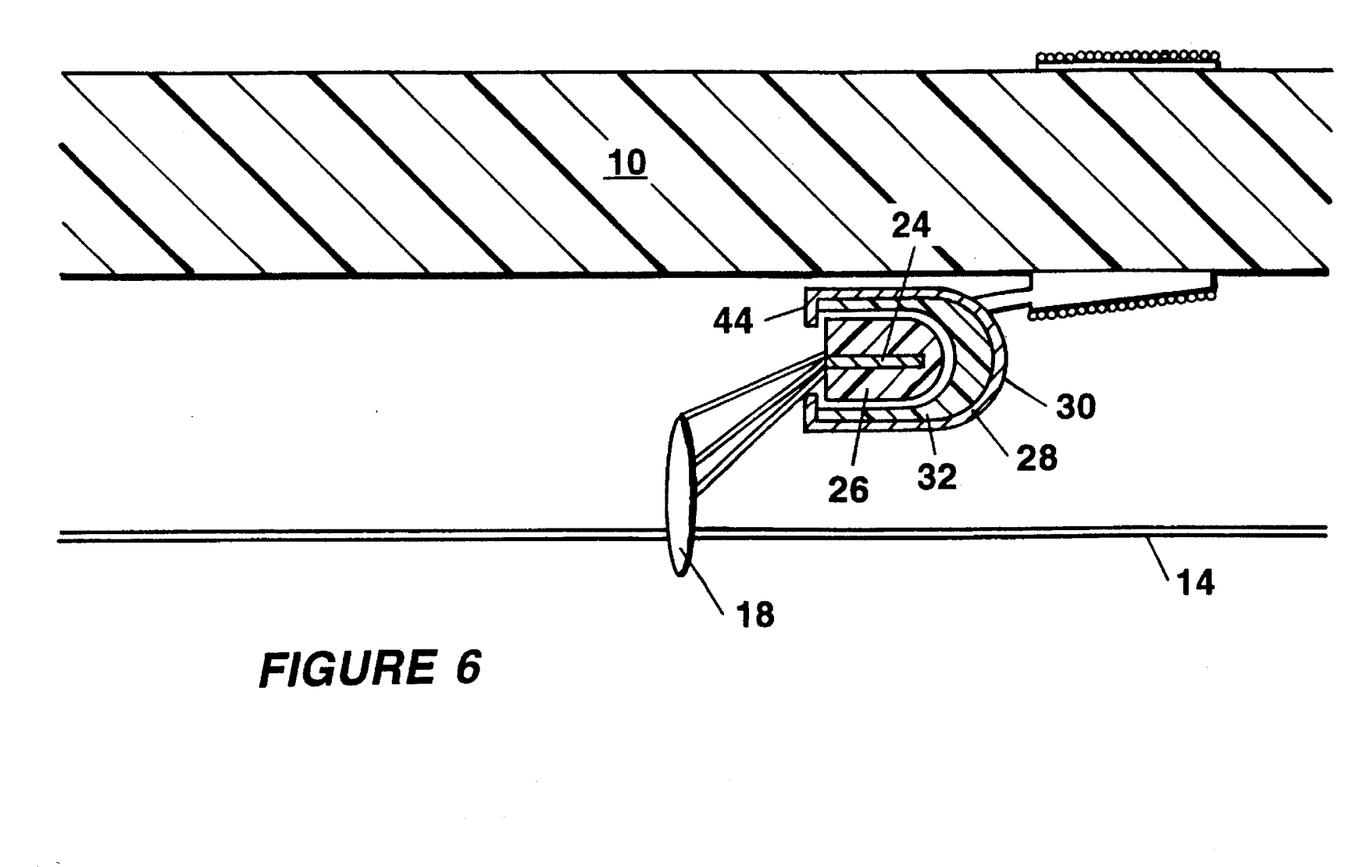
FIG. 6 is a cross sectional side view of yet another alternative embodiment of the invention in which a spring is used to bias the rotational position of the line guide.

In FIG. 6 is shown an alternative embodiment of the present invention in which the line guide includes just a single housing 28. The structure of the housing 28 is the same as each housing in the embodiment of FIG. 2, that is, a rotatable member 26 resides within housing 28 in contact with inner surface material 32. The eyelet 18 is rigidly affixed to the rotatable member 26 by foot 24, and is free to rotate due to the rotational connection between the rotatable member 26 and the housing 28. The outer shell 30 of the housing 28 includes a lip 44, which is ring-shaped, and has an inner diameter which is smaller than the outer diameter of rotatable member 26. The lip 44 therefore provides an obstruction which prevents the rotatable member 26 from disengaging from the housing 28. The housing 28 is secured to the rod 10 in the same manner as the housings 28 of the FIG. 2 embodiment.

The embodiment of FIG. 6 reduces the number of rod components, by requiting only one housing and one rotatable member for each line guide, and by using eyelets having supports on only one side. In addition, with fewer housings, less time is required for lashing the line guides to the rod. As such, this embodiment reduces the time and expense of manufacturing the rod. Nonetheless, the rod is still provided with the benefits achieved by the rotational connection between the line guide eyelets and the housings.

The FIG. 6 embodiment may also be used as the top line guide 20 of the rod 10. In the embodiment of FIG. 1, the top line guide 20 is specified as a fixed line guide, as is used in conventional fishing rods. However, the FIG. 6 embodiment may be substituted for the fixed line guide of FIG. 1 to provide a pivoting top line guide in addition to the pivoting line guides 16 distributed along the length of the rod 10. As such, all of the line guides would pivot together as the angle of the pull on the line changed.

Figure 7:
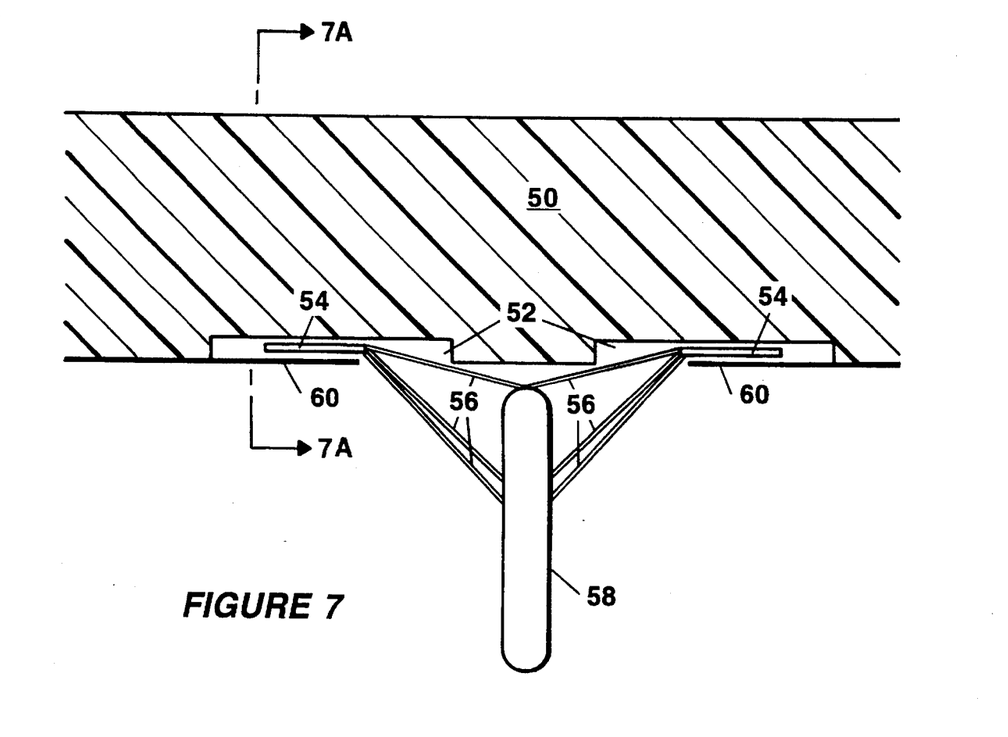
FIG. 7 is a cross sectional side view of a further alternative embodiment of the invention in which the line guide feet are mounted in a slot of the rod.
Figure 7A:
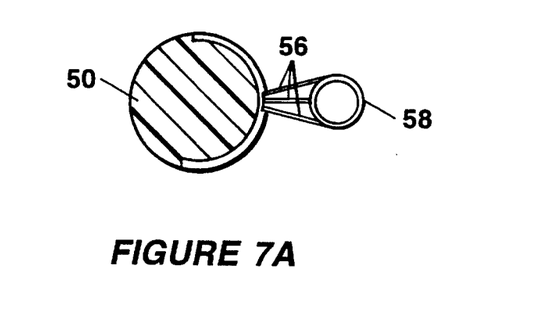
FIG. 7A is a cross sectional top view of the line guide depicted in FIG. 7.

A further alternative embodiment is shown in FIG. 7, which is a cross sectional side view of a rod 50 which has slots 52 within which the feet 54 of line guide 56 are mounted. As shown in FIG. 7A, which is a cross sectional top view of the rod, each slot 52 is semi-circular in shape, and has a radius slightly smaller than the radius of an outer surface of the rod 50. As such, each slot 52 provides a semi-circular guide within which one of the feet 54 is free to move.

Each of the feet 54 is attached to support arms 56 which, in turn, are connected to eyelet 58 of the line guide. The feet 54 and support arms 56 are sufficiently rigid that the feet 54 maintain a particular separation relative to each other. Each foot 54 is thus constrained to its respective slot 52 by a lip 60 of the rod 50. The stiffness of the support arms 56 and the feet 54 also keeps the feet 54 aligned along an axis parallel to a longitudinal axis of the rod 50. That is, the feet 54 tend to move together, each through its respective slot 54, such that the eyelet does not get skewed, and remains approximately in a plane which is perpendicular to the longitudinal axis of the rod 50.

The embodiment of FIGS. 7 and 7A provides a line guide which accomplishes the rotational function of the embodiment shown in FIG. 2. It will be understood that while only one of the line guides of the rod 50 is shown, the rod 50 will have other line guides which have the same type of connection to the rod, although they may be of a different size. Although the embodiment of FIGS. 7 and 7A does not use a conventional rod or a conventional line guide, as do other embodiments described above, the FIG. 7 embodiment has the advantage that a lateral force on the line guide is collinear with the resulting force on the rod. Thus, once the line guide has pivoted toward the direction of the line, the force placed on the line guide by the line is directly transmitted to the longitudinal axis of the rod 50.

While the invention has be shown and described with reference to a preferred embodiment thereof, it will be understood by those skilled in the art that various changes in form and detail may be made therein without departing from the spirit and scope of the invention as defined by the appended claims.

What is claimed is:

1. A fishing apparatus comprising:
   a flexible rod having a longitudinal axis;
   a plurality of line guide housings rigidly connected to and distributed along the rod; and
   a plurality of line guide eyelets each rotatably connected to at least one of the line guide housings such that the eyelets are limited to a single angular degree of freedom and am rotatable relative to the housings in a predetermined plane of rotation substantially transverse to the longitudinal axis of the rod.

2. A fishing apparatus according to claim 1 further comprising a fishing line which passes through each of the eyelets and which imparts a lateral force to the eyelets, the lateral force being sufficient to cause the rotation of each of the eyelets.

3. A fishing apparatus according to claim 1 wherein each eyelet comprises a rotatable member and each housing comprises an inner surface which conforms to an outer surface of a rotatable member, allowing the rotatable member to rotate freely within its housing.

4. A fishing apparatus according to claim 3 wherein each eyelet further comprises a flat mounting foot which is rigidly affixed to the rotatable member of that eyelet.

5. A fishing apparatus according to claim 3 wherein each rotatable member and the inner surface of each housing comprise a material having a low coefficient of friction.

6. A fishing apparatus according to claim 3 wherein each housing further comprises a lip which inhibits removal of a rotatable member seated within the housing.

7. A fishing apparatus according to claim 1 wherein each housing is secured to the rod by a winding of thread.

8. A fishing apparatus according to claim 1 wherein the eyelets are rotatable about a range of approximately 180°.

9. A fishing apparatus according to claim 1 wherein the eyelet comprises a pin which is rotatably mounted in a receiving hole of the housing.

10. A fishing apparatus according to claim 1 further comprising an elastic element which biases a rotatable connection between the eyelets and the housings such as to urge the eyelet to a particular angular position relative to the housing.

11. A fishing apparatus according to claim 10 wherein the elastic element comprises a spring.

12. A fishing apparatus according to claim 1 wherein the eyelets are each rotatably connected to two of the line guide housings.

13. A fishing apparatus according to claim 12 wherein, for each eyelet, the two line guide housings to which the eyelet is rotatably connected are substantially symmetrical about a plane perpendicular to the axis of rotation of the rotatable connection.

14. A fishing apparatus according to claim 13 wherein a circumference of each eyelet lies in a plane which is perpendicular to an axis of rotation of that eyelet.

15. A fishing apparatus according to claim 1 further comprising a top eyelet rigidly affixed to a distal end of the rod.

16. A line guide for a fishing rod comprising:
    a housing rigidly affixable to the fishing rod;
    an eyelet through which fishing line from the rod passes; and
    a connection means between the housing and the eyelet for providing a rotatable connection therebetween which limits the eyelet to a single angular degree of freedom such that the eyelet rotates relative to the housing in a predetermined plane of rotation substantially transverse to a longitudinal axis of the rod when subjected to a lateral force from the fishing line.

17. A line guide according to claim 16 wherein the eyelet comprises a rotatable member and the housing comprises an inner surface which conforms to an outer surface of the rotatable member, allowing the rotatable member to rotate freely within its housing.

18. A line guide according to claim 17 wherein the eyelet comprises a flat mounting foot which is rigidly affixed to the rotatable member.

19. A line guide according to claim 16 wherein the connection means comprises a material having a low coefficient of friction.

20. A line guide according to claim 16 wherein the connection means prevents separation of the eyelet and the housing.

21. A line guide according to claim 16 further comprising an elastic element which biases the connection means such as to urge the eyelet to a particular angular position relative to the housing.

22. A line guide according to claim 16 wherein the housing includes a first housing and a second housing, and wherein the connection means includes a first and a second connection means wherein the first and the second connection means are rotatably connected, respectively, to the first and second housing, an axis of rotation of the first connection means being colinear with an axis of rotation of the second connection means.

23. A method of restricting a fishing line to a fishing rod, the method comprising:
    providing a plurality of housings each rigidly affixed to and distributed along the rod;
    providing a plurality of eyelets through which the line passes; and
    securing each eyelet to a housing with a rotatable connection which limits the eyelet to a single angular degree of freedom such that the eyelet is free to rotate in a predetermined plane of rotation substantially transverse to a longitudinal axis of the rod.

24. A fishing apparatus comprising:

a flexible rod having a longitudinal axis;

a plurality of slots distributed at a plurality of locations along the rod, the slots each following a substantially circumferential path partially extending about the longitudinal axis of the rod; and a plurality of line guide eyelets slideably restricted to the slots, such that the eyelets are limited to a single angular degree of freedom and are movable in an angular path substantially transverse to the longitudinal axis of the rod.

* * * * *